United States Patent [19]
Aidlin et al.

[11] 3,797,640
[45] Mar. 19, 1974

[54] AUTOMATIC APPARATUS FOR ORIENTING AND FEEDING BOTTLES OR LIKE ARTICLES HAVING NECKS

[76] Inventors: Samuel S. Aidlin, 214 Beaumont St.; Stephen H. Aidlin, 3855 Shore Pkwy., both of Brooklyn, N.Y. 11235

[22] Filed: Jan. 24, 1972

[21] Appl. No.: 220,312

[52] U.S. Cl............... 198/33 AA, 198/45, 221/157
[51] Int. Cl............................................. B65g 47/24
[58] Field of Search........ 198/33 R, DIG. 4, DIG. 8, 198/33 AA, 33 AB, 33 AD, 45; 221/159, 160, 157

[56] References Cited
UNITED STATES PATENTS

| | | | |
|---|---|---|---|
| 921,672 | 5/1909 | Burr | 198/66 X |
| 3,031,059 | 4/1962 | Ingham | 198/33 AA |
| 1,445,296 | 2/1923 | Clark | 221/157 |
| 2,937,738 | 5/1960 | Albertoli | 198/33 AA |
| 492,034 | 2/1893 | Livingston | 198/45 |

Primary Examiner—Evon C. Blunk
Assistant Examiner—Joseph E. Valenza

[57] ABSTRACT

Automatic orienting and feeding apparatus for bottles with necks, or like articles, in which the bottles are picked up from a bin by an upwardly tilted escalator with shelves. The properly oriented bottles are blown off the shelves through an outlet opening into a chute adjacent the escalator top. The misoriented bottles are gripped by their thicker portion as they pass the outlet opening and are not blown off but are discharged after they pass the escalator top. In a modified embodiment the escalator is formed with a downwardly and rearwardly sloping portion and the initially misoriented bottles are blown off the shelves at that portion into a second chute in oriented position. Two or more escalators may be arranged in a bank to pick up from a common bin with their outlet openings offset relative one another so that their chutes do not block one another and deliver to a common conveyor belt.

10 Claims, 8 Drawing Figures

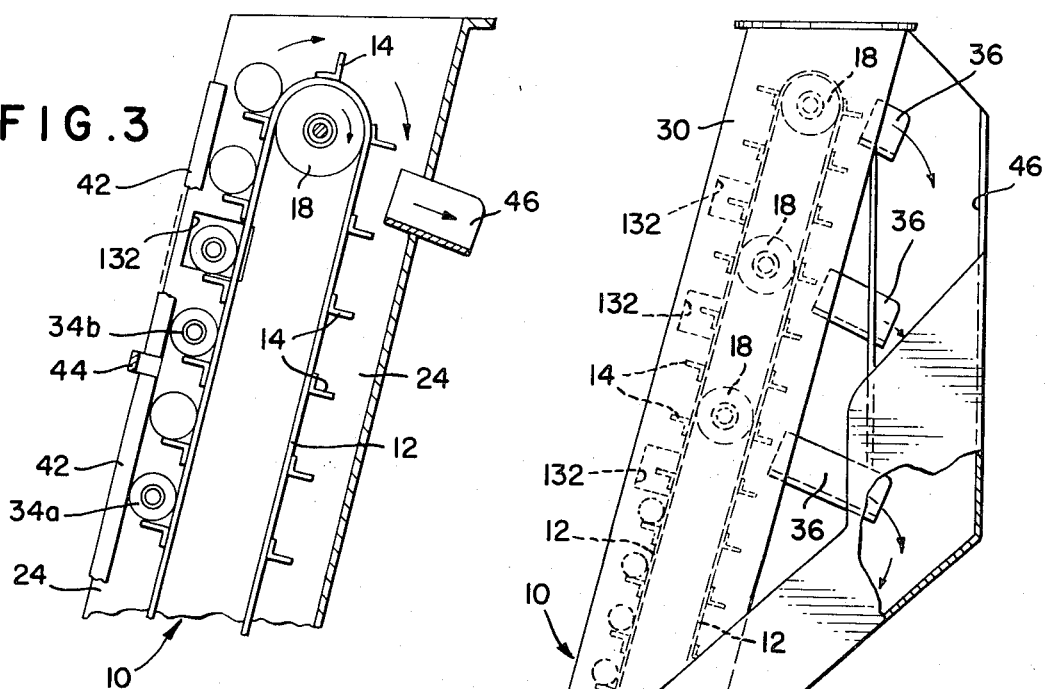
FIG.3
FIG.1
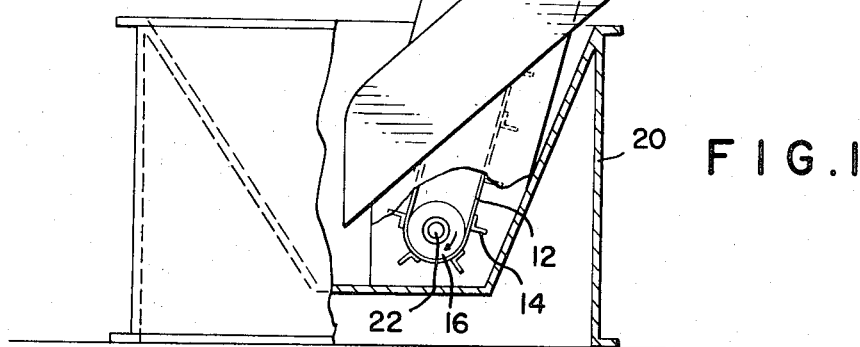
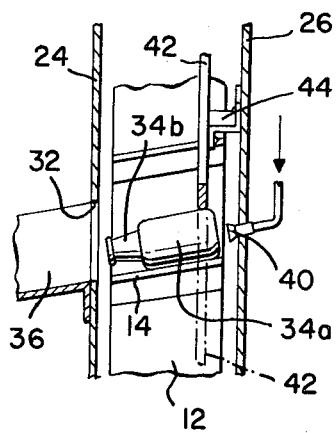
FIG.4
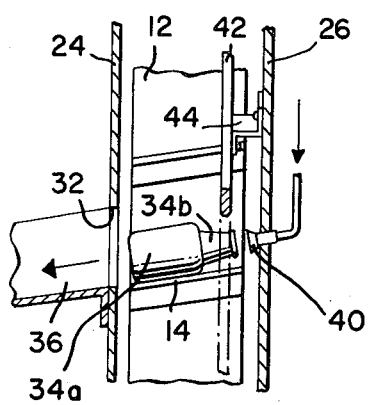
FIG.5

AUTOMATIC APPARATUS FOR ORIENTING AND FEEDING BOTTLES OR LIKE ARTICLES HAVING NECKS

The present invention relates to automatic apparatus for orienting and feeding bottles, or like articles having a neck-like formation at one end, onto a conveyor belt, in proper position for conveyance to a processing station, as to a filling and capping station.

Orienting and feeding apparatus for bottles, or like articles, of the type heretofore in use, have generally been of the rotary or vibrating hopper type, where the bottles are haphazardly picked up from a pile at the bottom of the hopper that either rotates or vibrates, and are moved toward a discharge chute into which only selected ones of the bottles; namely those in properly oriented position, as with bottoms down, are discharged; the others being returned to the bottom of the hopper for successive haphazard pick up. Such apparatus necessarily feed oriented articles at a limited rate of speed. Such apparatus also, because they are formed substantially entirely of metal and whose metal parts are constantly in motion, are relatively noisy, especially when operating at maximum speed. Further, such apparatus of the prior art, especially those of the rotary hopper type, are clumsy and bulky and occupy a great deal of floor space. For the latter reason, it is not generally practical to arrange a bank of such apparatus in a manner to have all of them feed their oriented articles to a common conveyor, for the purpose of attaining a rapid supply of oriented articles.

It is the object of the present invention, therefore, to provide automatic orienting and feeding apparatus for bottles, or like articles that will orient and feed articles, at a greatly increased rate of speed.

It is also an object of the present invention to provide automatic orienting and feeding apparatus of the character described which are laterally compact and which will occupy a minimum of floor space.

It is another object of the present invention to provide apparatus of the character described which, because of their relative compactness and the minimal floor space occupied by them, may be arranged in banks to feed oriented bottles to a common conveyor to thereby provide orienting and feeding apparatus having greater increased feeding capacity.

It is a further object of the present invention to provide automatic orienting and feeding apparatus of the character described which operates at a relatively reduced noise level.

It is a still further object of the present invention to provide compact and relatively quiet apparatus of the character described which may orient and feed all bottles picked up by it from a haphazardly oriented pile.

The foregoing and other objects and advantages of the apparatus of the present invention will become more readily apparent to those skilled in the art, from the emodiments thereof shown in the accompanying drawings, and from the description following. It is to be understood, however, that such embodiment is shown by way of illustration only, to make the principles and practice of the invention more readily comprehensible, and without any intent of limiting the invention to the specific details therein shown.

Generally stated, the present invention contemplates the moving of the bottles to be fed by the use of an escalator formed of an endless belt having spaced transverse shelves, and which is mounted for rotation in a generally upright position with its lower end disposed within a hopper, and having means at its upper end for engaging misoriented bottles for carrying them over the top of the escalator, at which point they drop into a return chute that returns them to the hopper. Properly oriented bottles are free of the engaging means and are either discharged by gravity or by means of a stream of air applied against them, at a point before they reach the top of the escalator, into a chute that lands them on a moving conveyor belt.

Two or more of the bottle escalators may be arranged in tandem, in side by side relation. When so arranged, the outlet for oriented bottles are offset relative to one another to permit each escalator to discharge into an individual chute without blocking the other. The oriented bottle outlet for such chutes may be offset relative to one another, as vertically, by having the several escalators, of different height, with the outlet of each taller one disposed above the top of the next lower one. All of the escalators, however, may feed the misoriented bottles into a common chute at the rear of the escalator.

In the drawings:

FIG. 1 is a more or less schematic side elevation of a multiple escalator unit orienting and feeding apparatus of the present invention;

FIG. 3 is a section taken on line 3—3 of FIG. 2;

FIG. 4 is a fragmentary, partly sectional and partly elevational view illustrating the movement of a misoriented bottle on the apparatus of the invention;

FIG. 5 is a view similar to that of FIG. 4, showing the movement of a properly oriented bottle on the apparatus of the invention;

Figure 2:
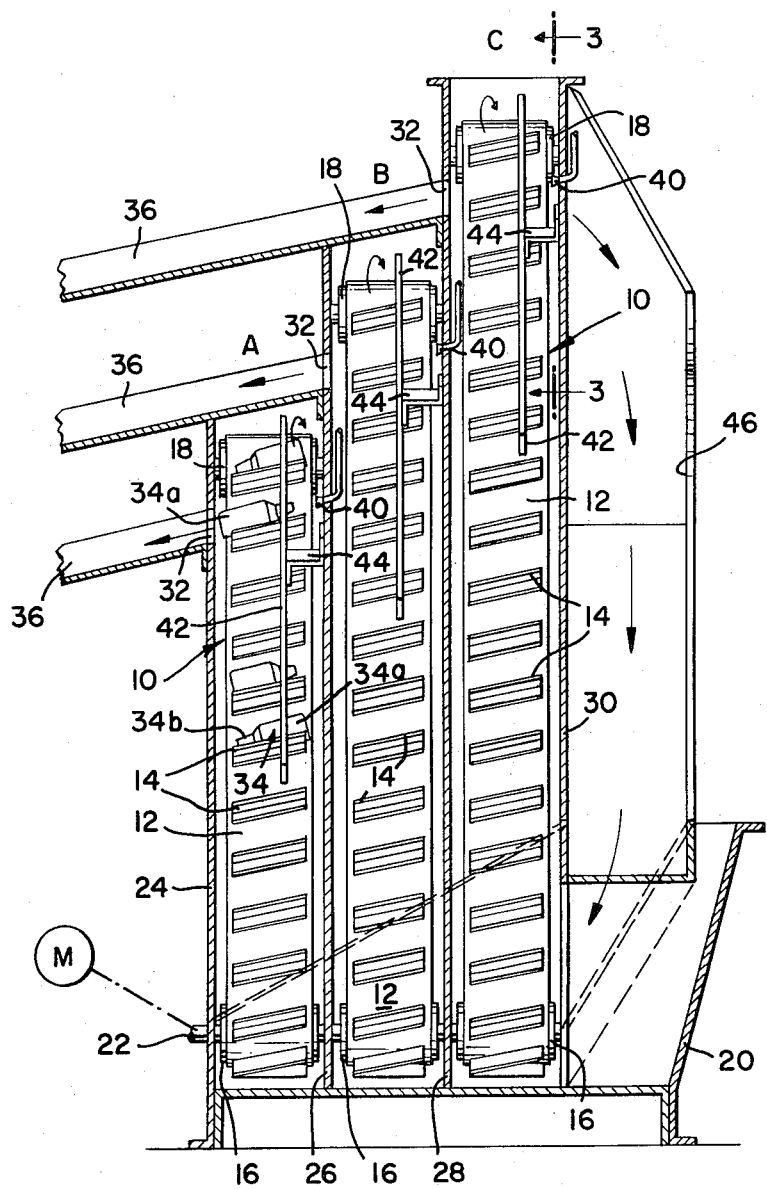
FIG. 2 is a front elevational view of the same.

Referring now, in greater detail, to the embodiments of the invention illustrated in the drawings, and particularly to the embodiment of FIGS. 1–5, inclusive, the same show an apparatus comprised of integrated multiple orienting and feeding units, illustrated as being three in number, and designated as A, B and C. Each unit comprises an uprightly disposed preferably rearwardly tilted escalator, generally designated as 10, formed of a flexible, endless belt, 12, of approximately the width of a bottle or the like to be fed. Belt 12 is provided witx longitudinally spaced, transverse shelves or cleats, 14, along its entire length. Each endless belt 12 is mounted over vertically spaced rollers; including a lower, driven roller, 16, and an upper, idler roller, 18. The lower roller 16 is disposed within a hopper 20, adjacent the bottom thereon and sufficiently spaced therefrom for the clearance of shelves 14. Roller 16, is mounted on a shaft, 22, that extends through the wall of the hopper 20, and is operatively connected to a motor, M. (FIG. 2)

Each unit, A, B and C, is defined by a pair of walls, extending uprightly along the longitudinal edges of its conveyor belt 12 and projecting forwardly therefrom at a distance equal at least to the width of a shelf 14, as well as rearwardly of the belt 12, and is preferably similarly tilted with the inner walls of the outer units, A, and C, also forming the walls of the unit B. Thus unit A is defined by walls, 24 and 26, and unit C is defined by the walls 28 and 30; unit B being defined by walls 26 and 28. (FIG. 2)

Figure 7:
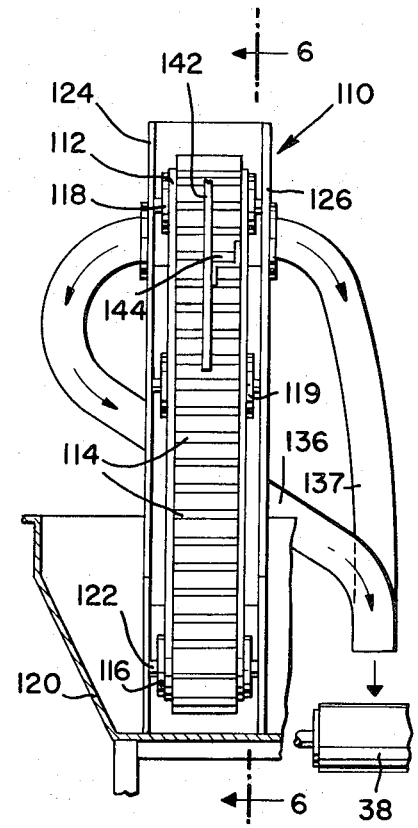
FIG. 7 is a front elevational and partly sectional view of the apparatus of FIG. 6.

Each unit, A, B and C, is provided in one of its side walls, as in walls 24, 26 or 28, with an outlet opening, 32, through which a properly oriented bottle, or like article, generally designated as 34, and formed with a relatively thicker bottom portion, 34a, and a neck portion, 34b, of reduced thickness, may be discharged from the escalator unit into a chute, 36, that will lead such bottle, in oriented position, as bottom down, unto a conveyor, such as 38 (FIG. 7). The discharge of an oriented bottle through an outlet opening, 32, may be effected by gravity, as by disposing shelves 14 at an angle to the longitudinal axis of the belt 12, and tilting downwardly in the direction of the wall having the opening 32 formed therein, or by a jet of compressed air, directed against the bottle by a jet nozzle, 40, that may blow it off the shelf 14 and through the outlet opening 32 into chute 36. Jet nozzle 40 may preferably be mounted on the opposed wall of the escalator unit, in position to direct the stream of air against the bottle 34, when its supporting shelf 14, reaches the lower end of the outlet opening 32, or by both, gravity and air jet.

It will be understood that shelves 14 may be formed at right angles to the axis of belt 12 and only the air jet utilized for discharging the bottle. However, the utilization of both gravity and air jet means for discharging the bottles, makes it possible to expedite the bottle discharge and thereby makes it possible to operate the escalator at higher speed.

Means are provided to prevent discharge of a misoriented bottle from the escalator through the outlet opening 32 by fricitionally engaging the thicker portion 34a of the bottle as it passes the outlet opening 34. In the illustrated embodiment, where the fed articles consist of bottles which are desired to be fed bottom down unto the conveyor belt, the engaging means are arranged to overlie the neck portion 34b of a properly oriented bottle whose bottom portion faces the outlet opening 32. In the illustrated embodiment, the bottle engaging means is shown to comprise a rod-like member 42, extending longitudinally over the conveyor belt 12, whose lower edge is disposed in position to be engaged by the thicker portion 34a of a bottle passing thereunder and to be cleared by its neck portion 34a, so that a bottle with its neck 34b facing the outlet opening 32 will be gripped by member 42, to be frictionally held in place while it faces the opening 32, whereas, a bottle whose thicker portion 34a faces the outlet 32, will have its neck portion underlie and clear the bottom edge of member 42 and be discharged into the outlet opening 32. Member 42 may be mounted, in any desired manner, preferably resiliently, as by preferably resilient brackets 44, supported on the wall of the escalator unit opposite the one having the outlet opening 32. A chute 46 is provided to the rear of the escalator in which misoriented bottles are automatically dropped after their supporting shelves pass the top of the unit and which returns said bottles back into the hopper 20.

In the orienting and feeding apparatus of the invention, where formed of multiple escalator units that may feed oriented bottles unto a single common conveyor, as illustrated in FIGS. 1 and 2, the units comprising the apparatus may have their outlet opening 32 in a manner that they, and the chutes serving them, will clear one another so as not to interfere with the feeding operation. This arrangement may be in the form illustrated in the drawings, wherein the units, A, B and C, are of different height, with the outlet opening 32 of unit B being above the top of unit A and the outlet opening of unit C above the top of unit B. However, other arrangements may be made to obtain the same results. Thus, for instance, units A and C may be of equal height and unit B higher than both A and B. In the latter arrangement, unit C may have its outlet opening 32 formed in its right hand wall instead of its left hand wall, as in unit A, and unit B may have its outlet opening in either one of its walls. Another arrangement for obtaining the same results of non-interference between the discharge means of the three units may be made by tilting the units A, B and C at different angles to the vertical, so that the outlet openings and chutes of the several units will be spaced horizontally relative to one another instead of vertically, as illustrated. Thus, unit B may be tilted forwardly or rearwardly of unit A and unit C may be tilted forwardly or rearwardly of unit B; in a manner that will be readily understod and not thought necessary to be specifically illustrated. In all of the foregoing arrangements of the escalators, they may all have a common shaft for their driving rollers 16.

Figure 6:
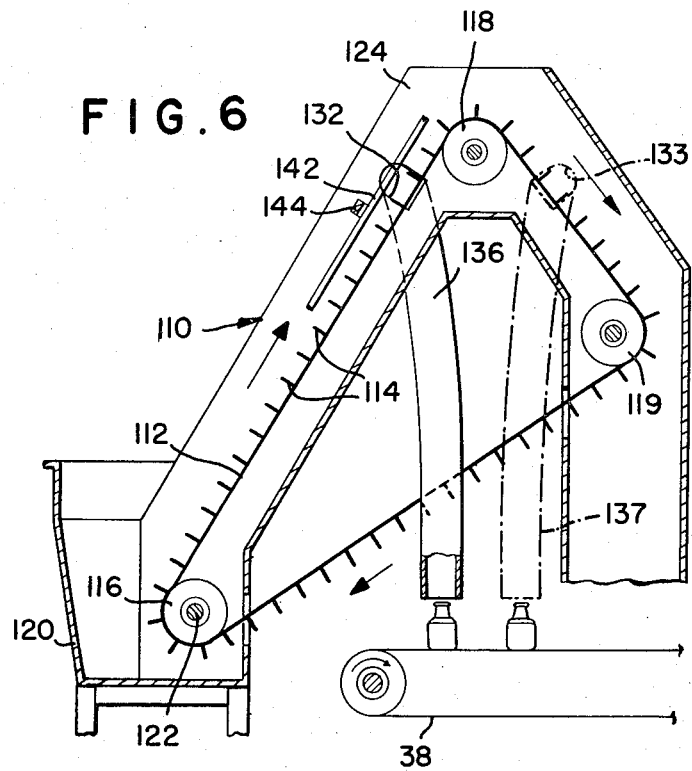
FIG. 6 is a more or less schematic view of orienting and feeding apparatus of the invention, modified to orient and feed all bottles picked up by its escalator from a haphazard pile in the hopper, taken on like 6—6 of FIG. 7.
Figure 8:
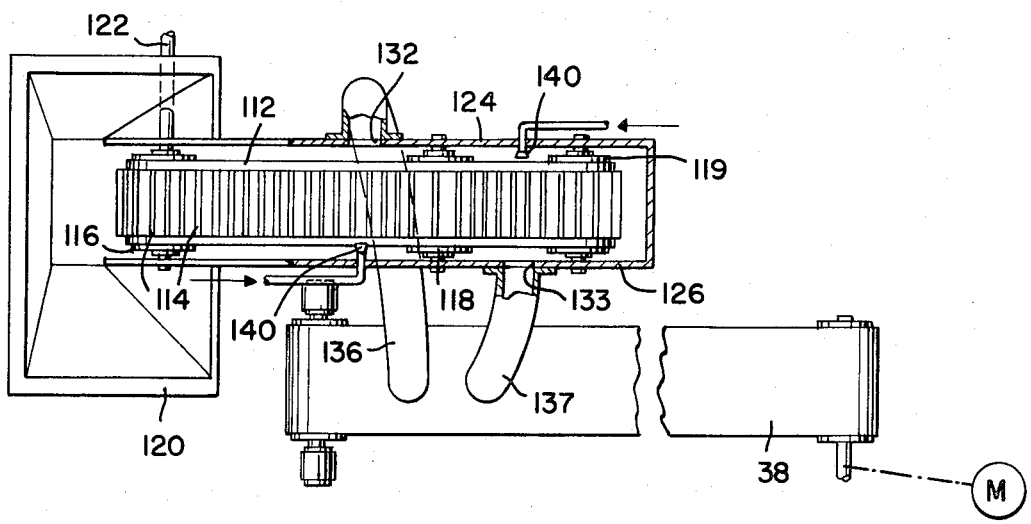
FIG. 8 is a top plan view of the same.

The modified embodiment of the invention illustrated in FIGS. 6–8 is designed for orienting and feeding all articles picked up on its escalator, to thereby increase the rate of delivery of oriented bottles or like articles as well as to eliminate the necessity for return chutes for any misoriented articles. This embodiment departs from the embodiment of FIGS. 1–5 in that, instead of having the escalator belt of the conveyor mounted over two generally upwardly spaced rollers to form a flattened, elongated annulus with substantially parallel front or upwardly moving and rear or downwardly moving belt sections, the escalator, 110, of FIGS. 6–8 has its conveyor belt 112 pass over three rollers; namely, a lower driven roller, 116, and upper, idler roller, 118, and a second idler roller, 119, mounted in rearwardly spaced relation to an imaginary line joining rollers 116 and 118, and disposed, preferably, opposite a midpoint of such line, whereby the conveyor belt 112, passing around the three rollers, assumes a triangular formation with the upper roller 118 at its apex.

Rollers 116, 118, and 119 are mounted on shafts 122, 123, and 125, respectively supported in vertical side or guard walls 124 and 126, at the sides of belt 112 and the shaft 122 of driven roller 116 is disposed at the bottom of the hopper, 120, and extended through a side wall thereof for operative connection to a motor (not shown).

Conveyor belt 112 is formed with spaced transverse shelves or steps, 114, that are disposed at right angles to the longitudinal axis of belt 112. One of the guard walls, as 124, is formed with an outlet opening, 132, disposed adjacent the forward, ascending side of belt 112, preferably in substantial proximity to roller 118. The other of the guard walls, as 126, is provided with an outlet opening 133 rearwardly or on the descending side of belt 112, between roller 118 and 119. Outlet opening 132 connects with a chute, 146, that is arranged to convey bottles fed therethrough to a horizontal conveyor belt 38. The other outlet opening 133 is connected to the chute 137 likewise arranged to convey bottles to the conveyor 38.

The embodiment of FIGS. 6, 7, and 8 is provided with means for discharging bottles through openings 132 and 133 consisting of air jet nozzles, 140 and 143, mounted, respectively, on guard walls 124 and 126; one of said jet nozzles being mounted on wall 126, opposite the opening 132 in wall 124, and the other of said nozzles being mounted on wall 124 opposite the outlet opening 133 in wall 126, at the rear or descending side of the escalator.

Means are provided on the front or ascending side of the apparatus for inhibiting the discharge of misoriented bottles through the front discharge opening 132. Such means may be similar to or identical with the means provided for that purpose on the apparatus of FIGS. 1-5, inclusive, consisting of a longitudinally extending rod or rod-like member, 142, supported, preferably resiliently, from a bracket 144 mounted on a guard wall, as the guard wall 126, opposite the opening 132 and in position to engage the thicker portion 34a of the bottle, or the like, and to clear the neck portion, 134b on the bottle passing under it.

It will be apparent that bottles oriented with their thicker portion 34a facing the opening 132 at the front of the escalator will clear the rod 142 and be blown off the shelf 114 by jet nozzle 140, through opening 132, as they pass into the chute 146 and unto the conveyor belt 38. Oppositely disposed bottles whose neck portion 134b faces opening 132, will be held on the conveyor belt until they pass the opening 132 and clear the rod 142 and are carried over the top of the escalator to the rear thereof when they are blown by jet nozzle 143 through opening 133 into the chute and unto the conveyor belt 112.

It may here be stated that conveyor 38 is shown, for convenience of illustration, as being to one side of escalator 110. It will be readily apparent, however, that it may be more conveniently and more compactly disposed directly below it.

It may here also be stated that the bin 20 or at least its lower portion may be of a width not substantially greater than the width of an escalator or bank of escalators (FIG. 6), to thereby facilitate the pick up of articles by the escalator or escalators. It may be further stated that the outer side or guard walls, as 24 and 30, or 124 and 126, may be supported in any desired manner as on the floor, or as by being made integral with the walls of the bin (FIG. 6), or secured thereto, and that intermediate guard walls, as 26 and 28, may, if desired, be supported on the outer guard walls.

It will also be apparent that more than one of the escalators 110 may be placed in a bank, in side by side relation, to form an apparatus of the present invention by tilting the escalators at different angles to the horizontal in a manner to permit clearance between their respective outlet openings 132 and 133 and connected chutes 146 and 147, which may be arranged to feed the articles to a common conveyor 38, in a manner that will be readily understood and not thought to be specifically illustrated.

This completes the description of the orienting and feeding apparatus of the present invention. It will be readily apparent that because the bottle-moving mechanism of the invention is disposed in substantially upright position, the bin or hopper for the bottles, or the like, may be relatively compact and occupy minimal floor area. It will also be apparent that because substantially all of the moving parts of the apparatus are nonmetallic, it will operate with a minimum of noise. It will likewise be apparent that the apparatus of the present invention may be conveniently arranged in banks of multiple units, all of which may feed oriented bottles to a common conveyor to thereby obtain a high feeding rate. It will be additionally apparent that the apparatus of the present invention may be readily modified to orient and feed all articles picked up by the escalator from the bin to thereby further enhance the rate of feeding oriented bottles by the apparatus.

It will be further apparent that numerous variations and modifications may be made in the apparatus of the present invention, by any one skilled in the art, in accordance with the principles of the invention hereinabove set forth and without the exercise of any inventive ingenuity.

What we claim is:

1. Automatic orienting and feeding apparatus for bottles, each of said bottles having a large diameter bottom portion and a narrower neck portion, comprising an escalator, said escalator including a pair of rollers, means supporting said rollers in vertically and laterally spaced relation to one another, an endless flexible band mounted over said rollers, a guard rail along each edge of said flexible band, at least along its upwardly facing, ascending side, said guard rails each projecting forwardly of said flexible band, said flexible band having a plurality of spaced shelves secured thereacross between its edges, means for rotating at least one of said rollers to move said flexible band, a chute extending outwardly of one of said guard rails and arranged to receive bottles blown off shelves which pass thereby, nozzle means positioned along the other one of said guard rails and opposite said chute for discharging a jet of air endwise against each bottle disposed on a shelf as it passes the nozzle means to blow said bottle off said shelf and into said chute, and friction bar means disposed above said flexible band in line with said guard rails in a position to frictionally engage the large diameter bottom portion of a bottle disposed on a shelf passing between said nozzle means and said chute to prevent a bottle whose large diameter bottom portion is frictionally engaged from being blown off the shelf into said chute, said bar being sufficiently spaced from the flexible band so as not to engage the neck portion of the bottles oriented with the neck adjacent the nozzle means.

2. The orienting and feeding apparatus of claim 1, including a bin for bottles to be fed, the lower end of said escalator being disposed within said bin and said roller rotating means rotating said at least one roller in the direction to pick up and elevate the bottles from said bin.

3. The orienting and feeding apparatus of claim 2, wherein the lower end of said escalator is disposed in spaced relation to one wall portion of said bin and is tilted in the direction to have the upper end of its ascending side overhang the opposed wall portion of said bin.

4. The orienting and feeding apparatus of claim 1 wherein a plurality of said escalators are disposed in contiguous position and wherein said outlet opening in each said escalator is offset relative to the outlet opening in an adjacent escalator in a direction to permit the outlet opening and the chute associated therewith to clear the said adjacent escalator.

5. The apparatus of claim 1, wherein said shelves are disposed on said flexible band at an angle to the longitudinal axis thereof, sloping in the direction of said chute.

6. The apparatus of claim 1, wherein means are provided at the descending side of said escalator for reconveying articles dropped therefrom into said bin.

7. The orienting and feeding apparatus of claim 1, wherein said shelves are of a width less than the thickness of the bottom portion of a bottle to be fed by the apparatus and said friction means comprises a rod extending longitudinally of said belt and means supporting said rod in position over said band to engage a bottle bottom portion as it passes under said rod.

8. The orienting and feeding apparatus of claim 7, wherein the means supporting said rod are resilient and are mounted on one of said guard walls.

9. The orienting and feeding apparatus of claim 1 wherein a third, idler roller is provided, said idler roller engaging the inner face of said flexible band on the descending side thereof, means supporting said idler roller opposite the ascending side of said flexible band and rearwardly of its upper end, to thereby form a rearwardly and downwardly sloping descending flexible band portion, a guard rail along each edge of said descending flexible band portion, a second chute extending outwardly of the descending guard rail aligned with said other one of the ascending guard rails arranged to receive bottles blown off shelves which pass thereby, and nozzle means positioned in line with the other one of said descending guard rails and opposite said second chute for discharging a jet of air endwise against each bottle disposed on a shelf as it passes thereby to blow said bottle off said shelf and into said second chute.

10. The orienting and feeding apparatus of claim 9, in combination with a horizontally disposed conveyor underlying said rearwardly sloping portion of said flexible belt, said chutes arranged to deposit bottles fed by them in longitudinally aligned relation on said horizontal conveyor.

* * * * *